United States Patent

Pinckaers

[15] 3,694,663

[45] Sept. 26, 1972

[54] CONDITION RESPONSIVE CIRCUIT WITH LIMITED INTERNAL DISSIPATION

[72] Inventor: Balthasar Hubert Pinckaers, Edina, Minn.

[73] Assignee: Honeywell Inc., Minneapolis, Minn.

[22] Filed: Aug. 5, 1971

[21] Appl. No.: 169,565

[52] U.S. Cl. .................. 307/116, 219/510, 340/228
[51] Int. Cl. ............................................. H01h 35/00
[58] Field of Search ...... 307/116, 117; 219/509, 510, 219/494; 340/227, 228

[56] References Cited

UNITED STATES PATENTS 3,523,182  8/1970  Phillips et al. ......... 307/117 X
3,566,151  2/1971  Wilburn .................... 307/117

Primary Examiner—Robert K. Schaefer
Assistant Examiner—William J. Smith
Attorney—Lamont B. Koontz et al.

[57] ABSTRACT

A condition responsive circuit, disclosed as including a temperature responsive element, is adapted to be connected by a pair of terminals to an alternating current load and to a source of alternating current voltage. The condition responsive circuit contains two different input impedances connected through a transistor to a differential amplifier to control a solid state switch, shown as a Triac. One of the input impedances is connected by a four-layer diode across the input of the condition responsive circuit and shorts the circuit out if the differential amplifier has not been energized to in turn operate the solid state power switching means, or Triac, prior to the voltage across the four-layer diode reaching its breakover potential. This arrangement allows for switching to a relatively high impedance within the condition responsive circuit to limit the dissipation except during the initial energizing portion of the applied waveform.

10 Claims, 1 Drawing Figure

PATENTED SEP 26 1972
3,694,663
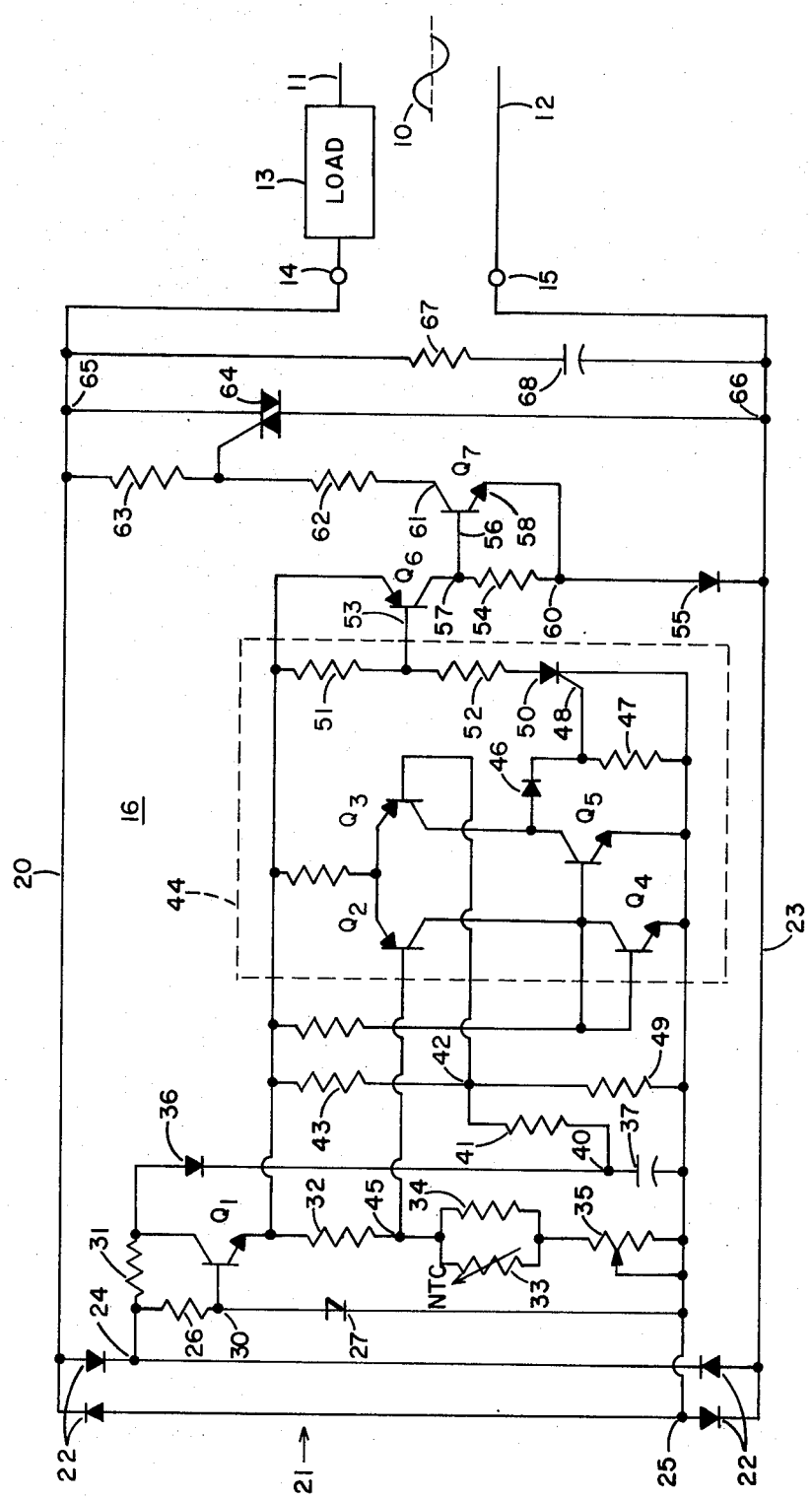
INVENTOR.
BALTHASAR HUBERT PINCKAERS
BY Alfred N. Feldman
ATTORNEY.

CONDITION RESPONSIVE CIRCUIT WITH LIMITED INTERNAL DISSIPATION

BACKGROUND OF THE INVENTION

In the field of solid state thermostats, the use of heat dissipating elements within the thermostat itself has created a substantial problem. It is normally necessary to provide a current flow through the thermostat in order to operate the electronics and the resultant heat that is generated tends to cause the thermostat to be inaccurate. It is thus desirable to energize the thermostat only periodically but this leads to difficult control problems.

SUMMARY OF THE INVENTION

The present invention is an electronic condition responsive circuit or thermostat that is energized through the load that it is to control, from a source of alternating current potential. As the voltage applied periodically starts to increase, a decision making circuit is activated to determine whether a solid state power switching means across the terminals of the condition responsive circuit are to be energized or not to be energized. If the solid state power switching means is not to be energized, the decision making input circuit automatically switches to increase the impedance in the circuit limiting the total amount of energy drawn from the source and thereby limiting the dissipation within the device. The arrangement is particularly useful in providing for a two-wire type of solid state, off-on thermostat for control of an alternating current load.

BRIEF DESCRIPTION OF THE DRAWING

The single FIGURE of the present application is a complete schematic drawing of a two-wire type of thermostat having an off-on control action, and which is adapted to be connected through an alternating current load to an alternating current source.

DESCRIPTION OF THE PREFERRED EMBODIMENT

A low voltage source of alternating current 10 is disclosed and ideally would be supplied from the secondary winding of a step-down control transformer. The source 10, while disclosed and claimed as an alternating current voltage, more generally is a periodically reversing voltage level and is supplied by conductors 11 and 12, through a load 13 to a pair of terminals 14 and 15 of a condition responsive circuit generally shown at 16. Terminal 14 is connected by conductor 20 to rectifier means 21, made up of a full wave bridge including four diodes 22, which in turn are connected by conductor 23 back to the terminal 15. With this arrangement, a full wave rectified, but unfiltered, voltage is available between junctions 24 and 25.

Junction 24 is connected to a first impedance 26, in the form of a resistor, which in turn is connected to a voltage breakdown means 27, disclosed as a four-layer diode. The first circuit means made up of the impedance 26 and the voltage breakdown means 27 are connected in series across the junctions 24 and 25. At the beginning of each half cycle of the applied line voltage, a rising voltage is applied across the breakdown means 27 until its breakdown voltage has been reached, at which time it suddenly conducts thereby substantially shorting a junction 30, between the impedance means 26 and the voltage breakdown means 27, to the voltage at the junction 25.

A second circuit means is connected at junction 24 through an impedance or resistor 31 to a solid state switch means or transistor Q1, and then to a condition responsive means made up of a resistor 32 connected in series with the parallel combination of a temperature sensitive resistance 33 and a linearizing or characterizing resistor 34 along with a set point potentiometer 35 that in turn is connected back to junction 25. The temperature responsive or condition responsive element 33 has been disclosed in the present embodiment as a negative temperature coefficient thermistor and provides a temperature measuring function in a well-known fashion.

A diode 36 and series capacitor 37 are connected across the transistor Q1 and the voltage divider network made up of resistors 32, 33, 34, and 35. At a junction point 40 between the diode 36 and the capacitor 37, a resistor 41 is provided to a junction point 42 between a pair of resistors 43 and 49 that act as a voltage divider network, and one part of an input means for a switching circuit means generally disclosed at 44. The balance of the input means for the circuit means 44 is at a junction 45 between resistor 32 and the parallel combination of the negative temperature coefficient resistor 33 and the characterizing resistor 34.

The switching circuit means 44 is made up of a differential amplifier including transistors Q2 and Q3 along with current comparing transistors Q4 and Q5. The current comparing transistors Q4 and Q5 have an output through a diode 46 and resistor 47 to a gate 48 of a silicon controlled rectifier 50 that is connected through a pair of resistors 51 and 52 that form an output circuit means for the switching circuit means 44. The switching circuit means 44 will only briefly be discussed in connection with the operation of the present invention as this switching circuit means in and of itself is known in the patent art. This switching circuit means is fully disclosed and explained in U.S. Pat. No. 3,514,628 which issued on May 26, 1970 to the assignee of the present invention and is the work of the inventor of the present invention.

The junction of resistors 51 and 52 is connected by conductor 53 to a transistor Q6 and through a resistor 54 and diode 55 to provide a current path from the transistor Q1 through the transistor Q6, resistor 54 and diode 55 as part of the output circuit means of the present invention. The resistor 54 acts as a bias for a transistor Q7 that provides a unique function in the present system. Transistor Q7 has a base 56 connected at junction 57 between the collector of transistor Q6 and one end of resistor 54. The emitter 58 of transistor Q7 is connected to a junction 60 between the resistor 54 and the diode 55. The collector 61 of transistor Q7 is connected through a voltage divider made up of resistors 62 and 63 to provide a gating signal to a solid state power switching means 64, disclosed as a Triac. The solid state power switching means is connected at junctions 65 and 66 directly to the terminals 14 and 15. Also connected across the terminals 14 and 15 are resistor 67 and a capacitor 68 which are for transient suppression in a well-known fashion.

OPERATION

Before explaining the detailed operation of the circuit, a few typical values for certain of the components and voltages will put the operation into better perspective. The alternating sine wave current source voltage 10 has in a typical installation a peak value of 34 volts. Other important values are the resistance values of impedances 26 and 31. The resistor 26 has a value of 8,200 ohms, while the resistor 31 has a resistance value of 150 ohms. The four-layer breakdown device 27 has a characteristic wherein the device breaks over and becomes substantially a zero voltage drop upon reaching a level of 7.3 volts.

It will be first assumed that load 13 is an alternating current type of load that controls a heating source, and that at the application of power to the system no heat is being called for due to the temperature at the negative temperature coefficient thermistor 33 being at or above the set point. It will be further assumed that the voltage between terminals 14 and 15 is just beginning to provide terminal 14 with a rising voltage potential with respect to terminal 15.

Under the conditions set forth, a current will begin to flow in conductor 20, with conductor 20 positive with respect to conductor 23. The current will flow through the upper right hand diode of the full wave rectifier bridge 21 and is applied as a rising potential between the junctions 24 and 25. The rising potential between junctions 24 and 25 will cause the transistor Q1 to turn "on" by furnishing base drive current through the resistor 26 and current will be conducted between the collector and emitter of transistor Q1 through the resistor 32, the temperature responsive resistor 33, and the set point potentiometer 35. At this same time, the voltage at junction 30 will be rising but will be below the breakdown potential of the four-layer diode 27. The current flowing through transistor Q1 also provides current to the voltage divider made up of resistors 43 and 49 thereby establishing a voltage potential at the junction 42. The switching circuit means 44 compares the voltage between the junctions 42 and 45 to determine whether an output is necessary. It was originally assumed that no output was necessary, thereby leaving the differential amplifier made up of transistors Q2 and Q3 in such a state as to provide no output to the gate resistor 47 of the silicon controlled rectifier 50. The silicon controlled rectifier 50 therefore does not begin to conduct and the voltage at junction 30 continues to rise. As soon as the voltage at junction 30 reaches the breakover potential of the four-layer diode 27, the four-layer diode suddenly begins to conduct turns on and becomes substantially neglible in voltage drop. This shorts the junction 30 to the potential at junction 25 and the transistor Q1 ceases to conduct thereby diverting what little current flows through the resistors 26. Up until this time, current had been flowing through the relatively low resistance value of resistor 31, but the resistor is no longer the primary conduction path for the balance of the half cycle of applied voltage. The resistor 26 becomes a conduction path and it is a relatively high impedance thereby limiting the current drawn by the circuit to a very low value. The dissipation of the system therefore is maintained at a very low value when the load 13 is not being called on to supply heat for the system. This same function occurs on the reverse half cycle since the full wave bridge means 21 reverses the voltage applied so that the junctions 24 and 25 still see a voltage rise at 24 with respect to junction 25.

If it is now assumed that it is desirable to energize the load 13, that is, heat is needed as sensed by the negative temperature coefficient thermistor 33, a different function will occur. As the voltage at terminal 24 rises with respect to terminal 25, transistor Q1 begins to conduct as previously explained. The differential amplifier Q2 and Q3 in the switching circuit means 44 now provides an output of current flow through the diode 46 and the resistor 47 to provide a sufficient gating current for the silicon controlled rectifier 50.

Because of the bridge rectifier means 21 the voltage applied across the silicon controlled rectifier 50, along with the switching circuit means 44, is always of the same polarity and the silicon controlled rectifier conducts thereby generating a voltage drop across the resistor 51 which in turn causes the transistor Q6 to conduct. Conduction of current through transistor Q6 causes a current to flow through resistor 54 and diode 55 which generates a positive potential between the base 56 and emitter 58 whereby driving transistor Q7 into conduction. The conduction of transistor Q7 is through the resistor 63, resistor 62, collector 61, and through the emitter 58 to the diode 55. This current flow generates a voltage drop across resistor 63 that gates the solid state power switching means or Triac 64 into conduction. The conduction of Triac 64 substantially shorts the terminal 14 and 15 to one another thereby applying full potential from conductors 11 and 12 through the load 13 fully energizing this load.

On reversal of polarity of the voltage between terminals 14 and 15 a unique event occurs in the present system, above and beyond that previously described. The voltage applied across the Triac 64 has been reversed but the output of current flow in the transistor Q6 which is used to turn on transistor Q7 has remained the same due to the full wave rectifier bridge 21. Under these conditions, when a call for the operation of load 13 is still present, current still flows through the transistor Q6 from emitter to collector, but now the voltage appearing across conductors 20 and 23 has reversed in polarity with now conductor 23 being positive. The transistor Q7 at this time no longer acts as an ordinary transistor, but acts as a steering diode allowing current flow from the emitter of Q6 to the junction 57 and then to the base 56 of transistor Q7 and out of the collector of Q7. Current thus flows through the resistor 62 and the resistor 63 to the negative potential on conductor 20. This current flow causes the Triac 64 to again be gated into conduction and it shorts the terminals 14 and 15.

The transistor Q7 in this reverse voltage function acts as a steering diode rather than a conventional transistor and therefore provides a unique function. When the polarity across the transistor Q7 is positive on conductor 20 with respect to 23, it acts as a conventional transistor but when the potential is reversed it acts merely as a steering diode allowing current to flow from the base 56 to the collector 61 thereby providing the necessary output triggering signal for the solid state power switching means 64. The input circuits have remained unchanged and the dissipation in the system has been limited by the break down of the four-layer diode 27 to provide for current to flow through the impedance or resistance 26 as opposed through the much lower resistance 31 during the operation of the system beyond the 7.3 volt point, which is the decision making level for the condition responsive circuit as a whole.

Stated in a general fashion, the condition responsive circuit must decide whether to turn the load 13 "on" or leave the load 13 "off" before the voltage appearing across the four-layer diode 27 reaches its breakover potential, which occurs very early in each half cycle of the applied line voltage. This causes a limitation of the current being drawn by the condition responsive circuit means 16 and limits the internal dissipation of the device thereby making it ideal as a thermostat or temperature control system that is capable of replacing a conventional two-wire thermostat by merely connecting the present condition responsive circuit between terminals 14 and 15, which is where a conventional two-wire thermostat would be connected in a simple heating load circuit.

The present circuit provides a unique dissipation limiting arrangement and current steering configuration so that the solid state power switch means can be appropriately triggered across the terminals 14 and 15 to either control the load or leave the load deenergized as is demanded by the negative temperature coefficient thermistor 33.

The embodiments of the invention in which an exclusive property or right is claimed are defined as follows:

1. A condition responsive circuit adapted to energize load means from a voltage source having a periodically varying and reversing voltage level, including: a pair of terminals for said circuit adapted to be connected to said voltage source having said periodically varying voltage level and said load means to operatively energize said condition responsive circuit; first circuit means including impedance means and voltage breakdown means connected between said terminals; second circuit means including second impedance means, solid state switch means, and condition responsive means in parallel circuit with said first impedance means and said voltage breakdown means; and switching circuit means having input means connected to said second circuit means and further having output circuit means including solid state power switching means connected across said terminals to substantially short circuit said terminals upon operation of said power switching means; said switching circuit means operating said power switching means to energize said load means under the control of said condition responsive means providing the applied voltage level has not reached a sufficient voltage to cause said voltage breakdown means to conduct thereby substantially shortcircuiting said switching circuit input means to disable said switching circuit means.

2. A condition responsive circuit as described in claim 1 wherein said first circuit means includes rectifier means so that said periodically varying voltage level is always of the same polarity from a zero reference level.

3. A condition responsive circuit as described in claim 2 wherein said rectifier means includes full wave bridge means, and said power switching means is bidirectional in current conducting capabilities.

4. A condition responsive circuit as described in claim 3 wherein said impedance means are resistors and said solid state switch means is a transistor.

5. A condition responsive circuit as described in claim 3 wherein said switching circuit means is a differential amplifier and current comparing circuit to provide a current output to said bidirectional power switch means when said amplifier has an output prior to said voltage breakdown means conducting to disable said switching circuit means.

6. A condition responsive circuit as described in claim 5 wherein said voltage breakdown means is a four-layer diode.

7. A condition responsive circuit as described in claim 1 wherein said switching circuit means output circuit means is a transistor that operates as a transistor for current flow in a forward direction and as a diode for current flow in a reverse direction.

8. A condition responsive circuit as described in claim 7 wherein said first circuit means includes rectifier means so that said periodically varying voltage level is always in the same polarity from a zero reference level.

9. A condition responsive circuit as described in claim 8 wherein said rectifier means includes full wave bridge means and said power switching means is bidirectional in current conducting capabilities.

10. A condition responsive circuit as described in claim 9 wherein said switching circuit means is a differential amplifier and current comparing circuit to provide a current output to said bidirectional power switching means when said amplifier has an output prior to said voltage breakdown means conducting to disable said switching circuit means.

* * * * *